(12) United States Patent
Sakurazawa

(10) Patent No.: US 7,366,501 B2
(45) Date of Patent: Apr. 29, 2008

(54) MOBILE USING METHOD, SYSTEM AND COMPUTER PROGRAM TO ACCESS AND RECEIVE INFORMATION FROM MULTIPLE SERVERS

(75) Inventor: Takashi Sakurazawa, Tokyo (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 10/824,479

(22) Filed: Apr. 15, 2004

(65) Prior Publication Data

US 2004/0225735 A1 Nov. 11, 2004

(30) Foreign Application Priority Data

May 9, 2003 (JP) ............................. 2003-131691

(51) Int. Cl.
*H04M 3/42* (2006.01)

(52) U.S. Cl. .................................... 455/414.1; 705/14

(58) Field of Classification Search ......... 455/435.1–3, 455/437, 406, 412, 414.21, 432.3, 9, 13.1, 455/66.1, 426.2, 514, 414.1; 701/213
See application file for complete search history.

(56) References Cited

U.S. PATENT DOCUMENTS

| | | | | |
|---|---|---|---|---|
| 6,138,158 | A * | 10/2000 | Boyle et al. ................. | 709/225 |
| 6,256,498 | B1 * | 7/2001 | Ludwig ....................... | 455/433 |
| 6,473,609 | B1 * | 10/2002 | Schwartz et al. ............ | 455/406 |
| 6,647,260 | B2 * | 11/2003 | Dusse et al. ................ | 455/419 |
| 7,113,917 | B2 * | 9/2006 | Jacobi et al. ................ | 705/14 |
| 2002/0010631 | A1 * | 1/2002 | Sato et al. ................... | 705/14 |
| 2002/0077906 | A1 * | 6/2002 | Remler ........................ | 705/14 |
| 2002/0098832 | A1 * | 7/2002 | Fleischer et al. ........... | 455/414 |
| 2002/0164999 | A1 * | 11/2002 | Johnson ...................... | 455/456 |
| 2002/0184086 | A1 * | 12/2002 | Linde ........................... | 705/14 |
| 2003/0008650 | A1 * | 1/2003 | Matsuyama et al. ........ | 455/426 |
| 2003/0020671 | A1 * | 1/2003 | Santoro et al. ............... | 345/1.3 |
| 2003/0143982 | A1 * | 7/2003 | Wolters et al. .............. | 455/414 |
| 2003/0144017 | A1 * | 7/2003 | Inselberg ..................... | 455/517 |
| 2003/0182054 | A1 * | 9/2003 | Peterson et al. ............. | 701/207 |
| 2003/0224781 | A1 * | 12/2003 | Milford et al. .......... | 455/426.1 |
| 2003/0228866 | A1 * | 12/2003 | Pezeshki ................... | 455/422.1 |
| 2005/0071225 | A1 * | 3/2005 | Bortolin et al. .............. | 705/14 |
| 2006/0234684 | A1 * | 10/2006 | Shin ........................ | 455/414.1 |
| 2007/0049258 | A1 * | 3/2007 | Thibeault ................. | 455/414.1 |

FOREIGN PATENT DOCUMENTS

| | | |
|---|---|---|
| JP | 2002-117292 | 4/2002 |
| JP | 2002-251494 | 9/2002 |
| JP | 200315976 | 1/2003 |

* cited by examiner

*Primary Examiner*—Lester G. Kincaid
*Assistant Examiner*—Diego Herrera
(74) *Attorney, Agent, or Firm*—Oblon, Spivak, McClelland, Maier & Neustadt, P.C.

(57) ABSTRACT

A server provides a predetermined service for portable terminals (musical piece data of a musical piece to be reproduced at a time of reception of an incoming call) to a portable terminal, and supplies information about the provided service for portable terminals (purchase information) (an ID of the musical piece and the like) to a server. On the basis of the purchase information, the server transmits an electronic mail recommending a service for stationary terminals (a movie using the provided musical piece as a theme song) related to the service for portable terminals provided to a user to the portable terminal. The user can specify the service for stationary terminals to be provided using the electronic mail.

12 Claims, 14 Drawing Sheets

FIG. 8

| USER ID | USER INFORMATION |
|---|---|
| USER ID OF USER A | USER INFORMATION OF USER A |
| ⋮ | ⋮ |

F I G. 9

| USER ID | USER INFORMATION | CONTENT ID | DELIVERED/ UNDELIVERED |
|---|---|---|---|
| USER ID OF USER A | USER INFORMATION OF USER A | | |

FIG. 12

| USER ID | USER INFORMATION | CONTENT ID | DELIVERED/UNDELIVERED |
|---|---|---|---|
| USER ID OF USER A | USER INFORMATION OF USER A | xxxx | UNDELIVERED |

FIG. 14

| USER ID | USER INFORMATION | CONTENT ID | DELIVERED/ UNDELIVERED |
|---|---|---|---|
| USER ID OF USER A | USER INFORMATION OF USER A | xxxx | DELIVERED |

MOBILE USING METHOD, SYSTEM AND COMPUTER PROGRAM TO ACCESS AND RECEIVE INFORMATION FROM MULTIPLE SERVERS

BACKGROUND OF THE INVENTION

The present invention relates to a service providing system, an apparatus and a method for information processing, and a program, and particularly to a service providing system, an apparatus and a method for information processing, and a program that make it possible to provide services via a network effectively.

FIG. 1 shows an example of configuration of a conventional service providing system for providing a portable terminal 1-1 or a stationary terminal 1-2 (hereinafter referred to simply as a terminal 1 when it is not necessary to distinguish the terminals from each other individually; the same is true for other cases) in different forms (different in terms of processing capabilities, using methods and the like) which terminals are possessed by a user A with services corresponding to the forms via the Internet 2 (see Japanese Patent Laid-open No. 2002-117292).

The portable terminal 1-1 is connected to a service server 4 for portable terminals, which server is managed by a service provider for portable terminals, via a repeater 3 and the Internet 2, to be supplied with a predetermined service for portable terminals from the service server 4 for portable terminals. In a case where the portable terminal 1-1 is a portable telephone, for example, musical data of a musical piece to be reproduced at a time of reception of an incoming call is delivered to the portable terminal 1-1 from the service server 4 for portable terminals.

The stationary terminal 1-2 is connected to a service server 5 for stationary terminals, which server is managed by a service provider for stationary terminals, via the Internet 2, to be supplied with a predetermined service for stationary terminals from the service server 5 for stationary terminals. In a case where the stationary terminal 1-2 is a personal computer, for example, video data of a movie or the like is delivered to the stationary terminal 1-2 from the service server 5 for stationary terminals.

However, in the conventional service providing system, the service provider for portable terminals and the service provider for stationary terminals providing respective services in different forms, for example, do not provide each other with information about services provided to users, and do not provide services using the information. Therefore, for example, the service provider for stationary terminals does not recommend or sell to users a service for stationary terminals (a movie using a musical piece as a theme song) related to a service content for portable terminals (the musical piece to be reproduced at a time of reception of an incoming call) provided by the service provider for portable terminals.

SUMMARY OF THE INVENTION

The present invention has been made in view of the above, and it is accordingly an object of the present invention to make it possible for service providers providing services in different forms to provide each other with information about services provided, and thus provide services effectively.

According to the first aspect of the present invention, there is provided a service providing system including:

a first server for providing a first service to a first terminal via a network; and a second server for providing a second service to a second terminal via the network;

wherein the first server includes:

first providing means for providing the first service to the first terminal; and first transmitting means for transmitting provision information indicating that the first service has been provided by the first providing means to the second server; and the second server includes:

detecting means for recognizing from the provision information transmitted from the first transmitting means of the first server that the first service has been provided, and detecting the second service related to the first service;

second transmitting means for transmitting recommendation information for recommending the second service detected by the detecting means to the first terminal;

registering means for registering the second service recommended by the recommendation information and requested to be provided by the first terminal; and second providing means for providing the second service registered by the registering means to the second terminal in response to a request from the second terminal.

According to the second aspect of the present invention, there is provided an information processing apparatus for providing a first service to a terminal via a network, the apparatus including:

providing means for providing the first service to the terminal; and transmitting means for transmitting provision information indicating that the first service has been provided by the providing means to a server for providing a second service via the network.

According to the third aspect of the present invention, there is provided an information processing method for providing a first service to a terminal via a network, the method including:

a providing step for providing the first service to the terminal; and a transmitting step for transmitting provision information indicating that the first service has been provided by processing of the providing step to a server for providing a second service via the network.

According to the fourth aspect of the present invention, there is provided a program of an information processing apparatus for providing a first service to a terminal via a network, the program making a computer perform a process including:

a providing control step for controlling providing the first service to the terminal; and a transmitting control step for controlling transmitting provision information indicating that the first service has been provided by processing of the providing control step to a server for providing a second service via the network.

According to the fifth aspect of the present invention, there is provided an information processing apparatus for providing a first service to a first terminal via a network, the apparatus including:

detecting means for recognizing that a second service has been provided from provision information indicating that the second service has been provided, the provision information being transmitted from a server for providing the second service to a second terminal via the network, and detecting the first service related to the second service;

transmitting means for transmitting recommendation information for recommending the first service detected by the detecting means to the second terminal;

registering means for registering the first service recommended by the recommendation information and requested to be provided by the second terminal; and providing means for providing the first service registered by the registering means to the first terminal in response to a request from the first terminal.

According to the sixth aspect of the present invention, there is provided an information processing method for providing a first service to a first terminal via a network, the method including:

a detecting step for recognizing that a second service has been provided from provision information indicating that the second service has been provided, the provision information being transmitted from a server for providing the second service to a second terminal via the network, and detecting the first service related to the second service;

a transmitting step for transmitting recommendation information for recommending the first service detected by processing of the detecting step to the second terminal;

a registering step for registering the first service recommended by the recommendation information and requested to be provided by the second terminal; and a providing step for providing the first service registered by processing of the registering step to the first terminal in response to a request from the first terminal.

According to the seventh aspect of the present invention, there is provided a program of an information processing apparatus for providing a first service to a first terminal via a network, the program making a computer perform a process including:

a detecting control step for recognizing that a second service has been provided from provision information indicating that the second service has been provided, the provision information being transmitted from a server for providing the second service to a second terminal via the network, and controlling detecting the first service related to the second service;

a transmitting control step for controlling transmitting recommendation information for recommending the first service detected by processing of the detecting control step to the second terminal;

a registering control step for controlling registering the first service recommended by the recommendation information and requested to be provided by the second terminal; and a providing control step for controlling providing the first service registered by processing of the registering control step to the first terminal in response to a request from the first terminal.

In the service providing system according to the present invention, the first server provides a first service to a first terminal and transmits provision information indicating that the first service has been provided to a second server; and the second server recognizes from the provision information that the first service has been provided and detects a second service related to the first service, transmits recommendation information for recommending the detected second service to the first terminal, registers the second service recommended by the recommendation information and requested to be provided by the first terminal, and provides the registered second service to a second terminal in response to a request from the second terminal.

The first information processing apparatus and method and the first program according to the present invention provide a first service to a terminal, and transmit provision information indicating that the first service has been provided to a server for providing a second service via a network.

The second information processing apparatus and method and the second program according to the present invention recognize that a second service has been provided from provision information indicating that the second service has been provided, the provision information being transmitted from a server for providing the second service to a second terminal via a network, and detect a first service related to the second service, transmit recommendation information for recommending the detected first service to the second terminal, register the first service recommended by the recommendation information and requested to be provided by the second terminal, and provide the registered first service to a first terminal in response to a request from the first terminal.

According to the present invention, services can be provided via a network effectively.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a diagram showing information registered in the service server for portable terminals in FIG. 2;

FIG. 9 is a diagram showing information registered in the service server for stationary terminals in FIG. 2;

FIG. 12 is a diagram showing other information registered in the service server for stationary terminals in FIG. 2;

FIG. 14 is a diagram showing other information registered in the service server for stationary terminals in FIG. 2.

DETAILED DESCRIPTION OF THE PREFERRED EMBODIMENT

Figure 1:
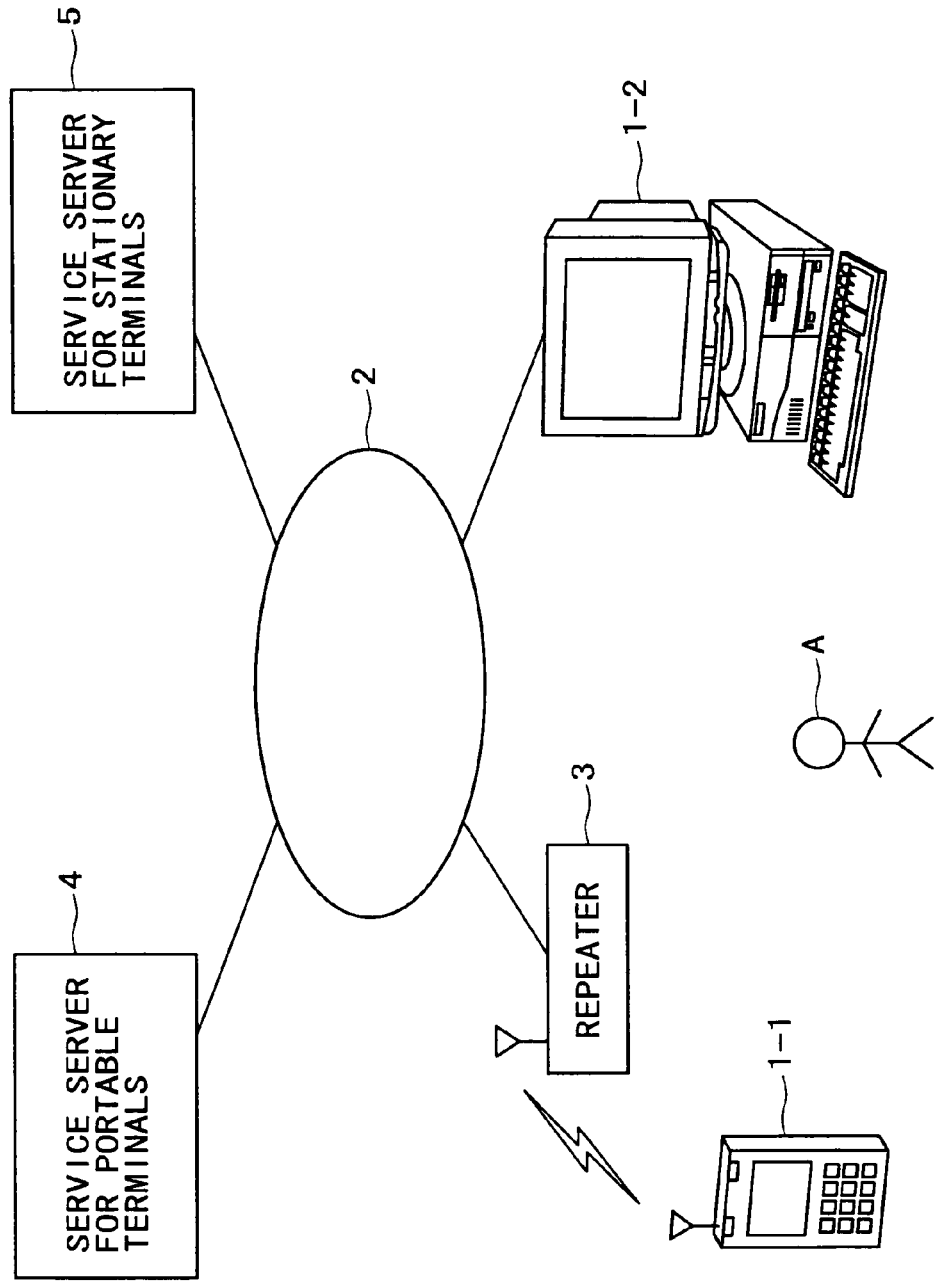
FIG. 1 is a diagram showing an example of configuration of a conventional service providing system.

A preferred embodiment of the present invention will hereinafter be described. In order to clarify correspondences between means of the invention set forth in claims and the following embodiment, features of the present invention will be described as follows with a corresponding embodiment (a mere example) added in parentheses succeeding each means. However, this description of course does not imply that each means is limited to the described example.

In a service providing system according to the present invention, a first server (for example a service server 12 for portable terminals in FIG. 2) includes: first providing means (for example a CPU 71 and a communicating unit 79 in FIG. 5 for performing processing of step S11 in FIG. 10) for providing a first service (for example a service for portable terminals) to a first terminal (for example a portable terminal 11-1 in FIG. 2); and first transmitting means (for example the CPU 71 and the communicating unit 79 in FIG. 5 for performing processing of step S12 in FIG. 10) for transmitting provision information (for example purchase information) indicating that the first service has been provided by the first providing means to a second server (for example a service server 13 for stationary terminals in FIG. 2); and a second server includes: detecting means (for example a CPU 91 and a hard disk 94 in FIG. 6 for performing processing of step S21 in FIG. 10) for recognizing from the provision information transmitted from the first transmitting means of the first server that the first service has been provided, and detecting a second service (for example a service for stationary terminals) related to the first service; second transmitting means (for example the CPU 91 and a communicating unit 99 in FIG. 6 for performing processing of step S22 in FIG. 10) for transmitting recommendation information (for example an electronic mail including a URL) for recommending the second service detected by the detecting means to the first terminal; registering means (for example the CPU 91 and the hard disk 94 in FIG. 6 for performing processing of step S24 in FIG. 10) for registering the second service requested to be provided by the first terminal and recommended by the recommendation information; and second providing means (for example the CPU 91 in FIG. 6 for performing processing of steps S52 and S53 in FIG. 13) for providing the second service registered by the registering means to a second terminal in response to a request from the second terminal.

A first information processing apparatus according to the present invention (for example a service server 12 for portable terminals in FIG. 2) includes: providing means (for example a CPU 71 and a communicating unit 79 in FIG. 5 for performing processing of step S11 in FIG. 10) for providing a first service (for example a service for portable terminals) to a terminal (for example a portable terminal 11-1 in FIG. 2); and transmitting means (for example the CPU 71 and the communicating unit 79 in FIG. 5 for performing processing of step S12 in FIG. 10) for transmitting provision information (for example purchase information) indicating that the first service has been provided by the providing means to a server (for example a service server 13 for stationary terminals in FIG. 2) for providing a second service (for example a service for stationary terminals) via a network.

A second information processing apparatus according to the present invention (for example a service server 13 for stationary terminals in FIG. 2) includes: detecting means (for example a CPU 91 and a hard disk 94 in FIG. 6 for performing processing of step S21 in FIG. 10) for recognizing that a second service (for example a service for portable terminals) has been provided from provision information (for example purchase information) indicating that the second service has been provided, the provision information being transmitted from a server (for example a service server 12 for portable terminals in FIG. 2) for providing the second service to a second terminal (for example a portable terminal 11-1 in FIG. 2) via a network, and detecting a first service (for example a service for stationary terminals) related to the second service; transmitting means (for example the CPU 91 and a communicating unit 99 in FIG. 6 for performing processing of step S22 in FIG. 10) for transmitting recommendation information (for example an electronic mail including a URL) for recommending the first service detected by the detecting means to the second terminal; registering means (for example the CPU 91 and the hard disk 94 in FIG. 6 for performing processing of step S24 in FIG. 10) for registering the first service requested to be provided by the second terminal and recommended by the recommendation information; and providing means (for example the CPU 91 in FIG. 6 for performing processing of steps S52 and S53 in FIG. 13) for providing the first service registered by the registering means to a first terminal in response to a request from the first terminal.

The second information processing apparatus further includes aggregating means (for example the CPU 91 in FIG. 6) for obtaining an aggregate number of transfers of provision information, wherein the providing means can provide the first service to the first terminal according to an aggregate result by the aggregating means.

Figure 2:
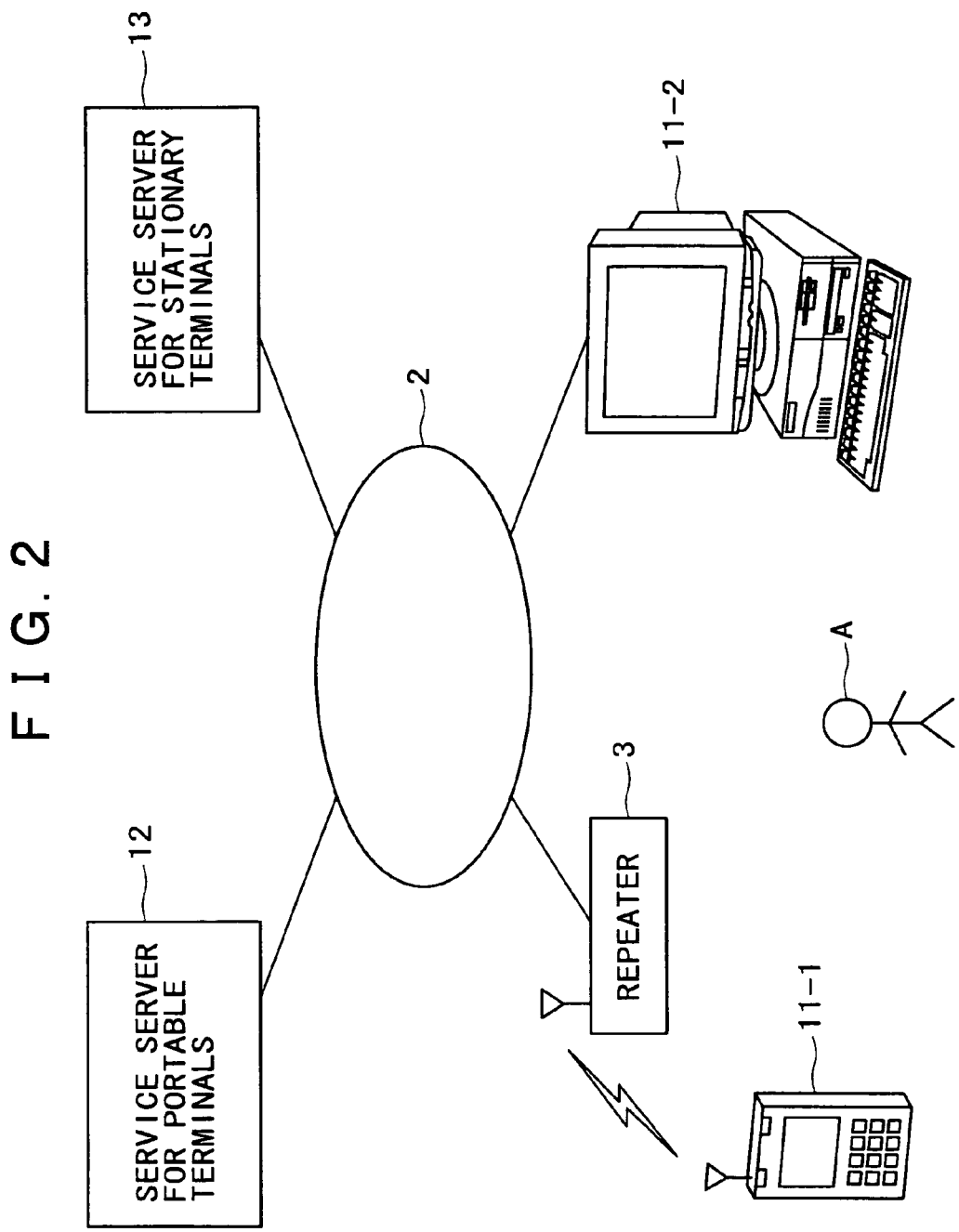
FIG. 2 is a diagram showing an example of configuration of a service providing system according to the present invention.

FIG. 2 shows an example of configuration of a service providing system to which the present invention is applied.

A portable terminal 11-1 of a user A is connected to a service server 12 for portable terminals, which server is managed by a service provider for portable terminals, via a repeater 3 and the Internet 2, to be supplied with a predetermined service for portable terminals from the service server 12 for portable terminals. In a case where the portable terminal 11-1 is a portable telephone, for example, musical data of a musical piece to be reproduced at a time of reception of an incoming call is delivered to the portable terminal 11-1 from the service server 12 for portable terminals.

A stationary terminal 11-2 of the user A is connected to a service server 13 for stationary terminals, which server is managed by a service provider for stationary terminals, via the Internet 2, to be supplied with a predetermined service for stationary terminals from the service server 13 for stationary terminals. In a case where the stationary terminal 11-2 is a personal computer, for example, video data of a movie or the like is delivered to the stationary terminal 11-2 from the service server 13 for stationary terminals.

In this case, as will be described later in detail, an electronic mail recommending a service for stationary terminals is transmitted to the portable terminal 11-1 from the service server 13 for stationary terminals, so that the user A can specify the service for stationary terminals to be provided using the electronic mail.

The service server 12 for portable terminals provides a predetermined service for portable terminals (for example delivers musical data of a musical piece to be reproduced at a time of reception of an incoming call) to the portable terminal 11-1, and supplies information about the provided service for portable terminals (hereinafter referred to as purchase information) to the service server 13 for stationary terminals via the Internet 2.

On the basis of the purchase information from the service server 12 for portable terminals, the service server 13 for stationary terminals detects a service for stationary terminals (a movie using, as a theme song, the musical piece to be reproduced at a time of reception of an incoming call which musical piece is provided to the portable terminal 11-1) related to the service for portable terminals provided to the user A by the service server 12 for portable terminals, and transmits an electronic mail recommending the service for stationary terminals to the portable terminal 11-1 via the Internet 2 and the repeater 3. When the portable terminal 11-1 requests the provision of the service for stationary terminals recommended by the electronic mail, the service server 13 for stationary terminals provides the service for stationary terminals to the stationary terminal 11-2 via the Internet 2 in response to a request from the stationary terminal 11-2, for example.

Figure 3:
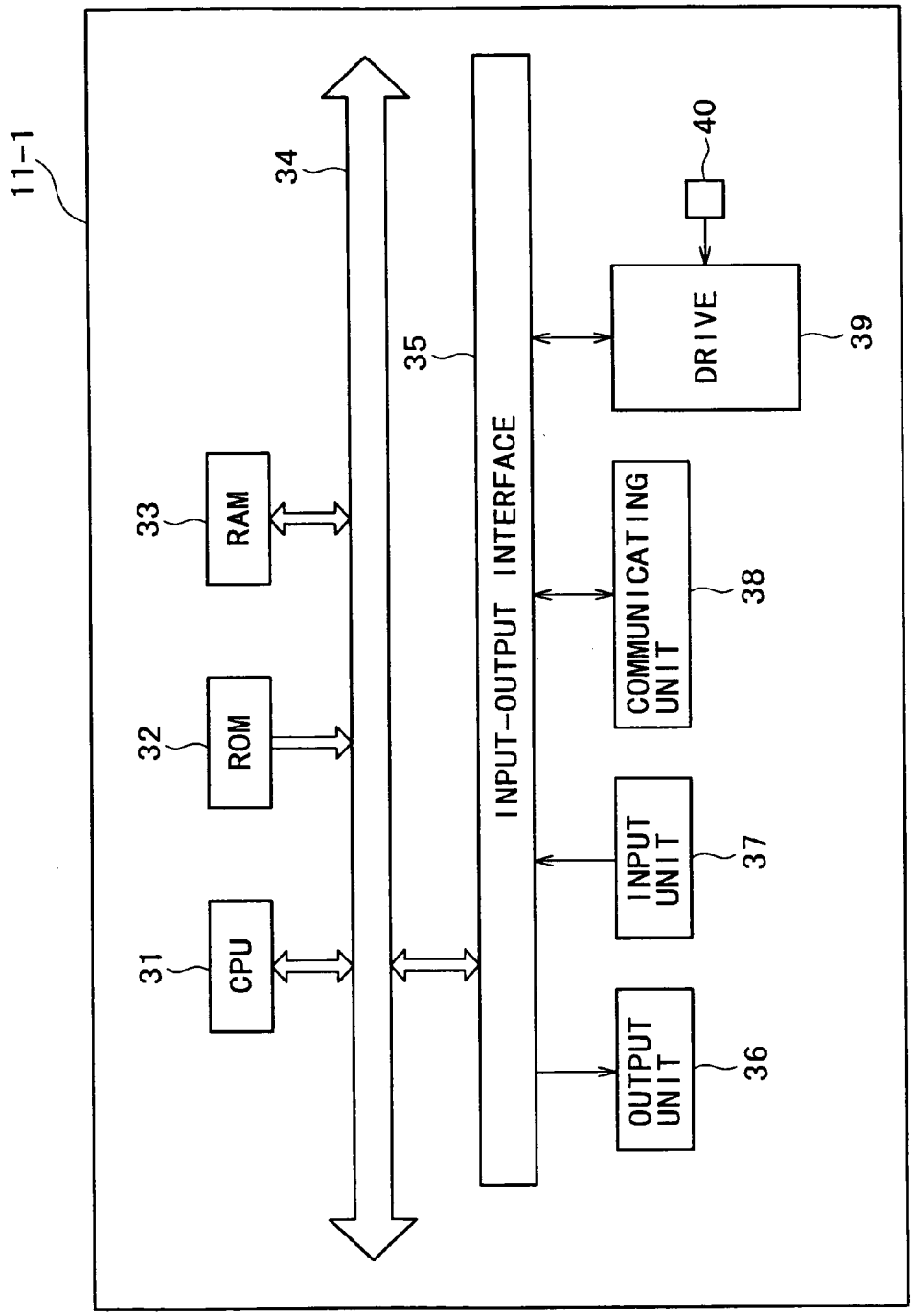
FIG. 3 is a block diagram showing an example of configuration of a portable terminal in FIG. 2.

FIG. 3 shows an example of configuration of the portable terminal 11-1. A CPU (Central Processing Unit) 31 is connected with an input-output interface 35 via a bus 34. When the user inputs a command from an input unit 37 including a keyboard, a mouse and the like via the input-output interface 35, the CPU 31 loads into a RAM (Random Access Memory) 33 a program stored on a recording medium such for example as a ROM (Read Only Memory) 32 or a semiconductor memory 40 inserted into a drive 39, and executes the program. Further, as required, the CPU 31 outputs a result of the processing to an output unit 36 including an LCD (Liquid Crystal Display) or the like via the input-output interface 35, for example. A communicating unit 38 performs radio communication with the repeater 3.

Figure 4:
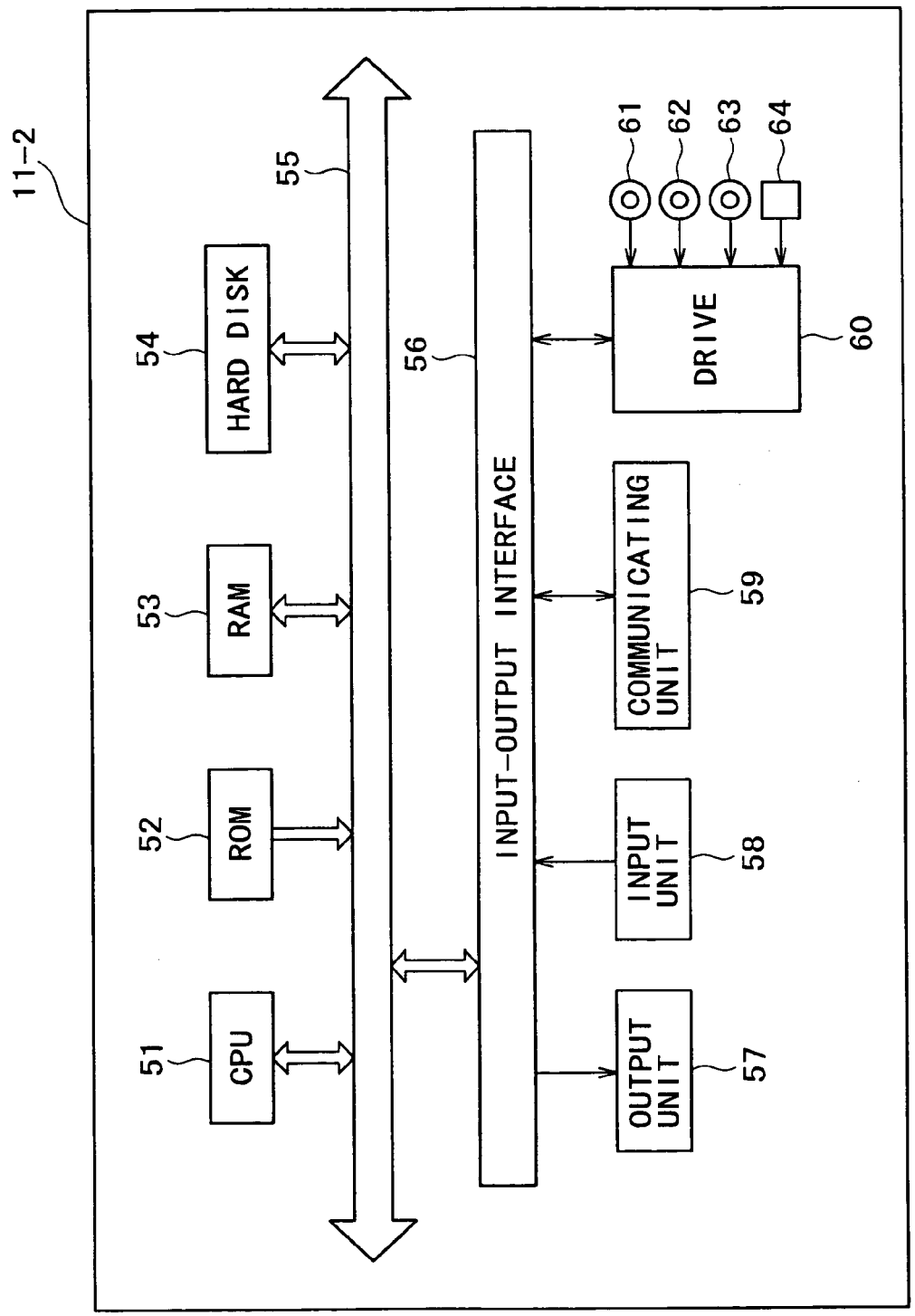
FIG. 4 is a block diagram showing an example of configuration of a stationary terminal in FIG. 2.

FIG. 4 shows an example of configuration of the stationary terminal 11-2. A CPU 51 is connected with an input-output interface 56 via a bus 55. When the user inputs a command from an input unit 58 including a keyboard, a mouse and the like via the input-output interface 56, the CPU 51 loads into a RAM 53 a program stored on a recording medium such for example as a ROM 52, a hard disk 54, or a magnetic disk 61, an optical disk 62, a magneto-optical disk 63, or a semiconductor memory 64 inserted into a drive 60, and executes the program. Further, as required, the CPU 51 outputs a result of the processing to an output unit 57 including an LCD or the like via the input-output interface 56, for example. A communicating unit 59 is connected to the Internet 2, and performs predetermined communication processing.

Figure 5:
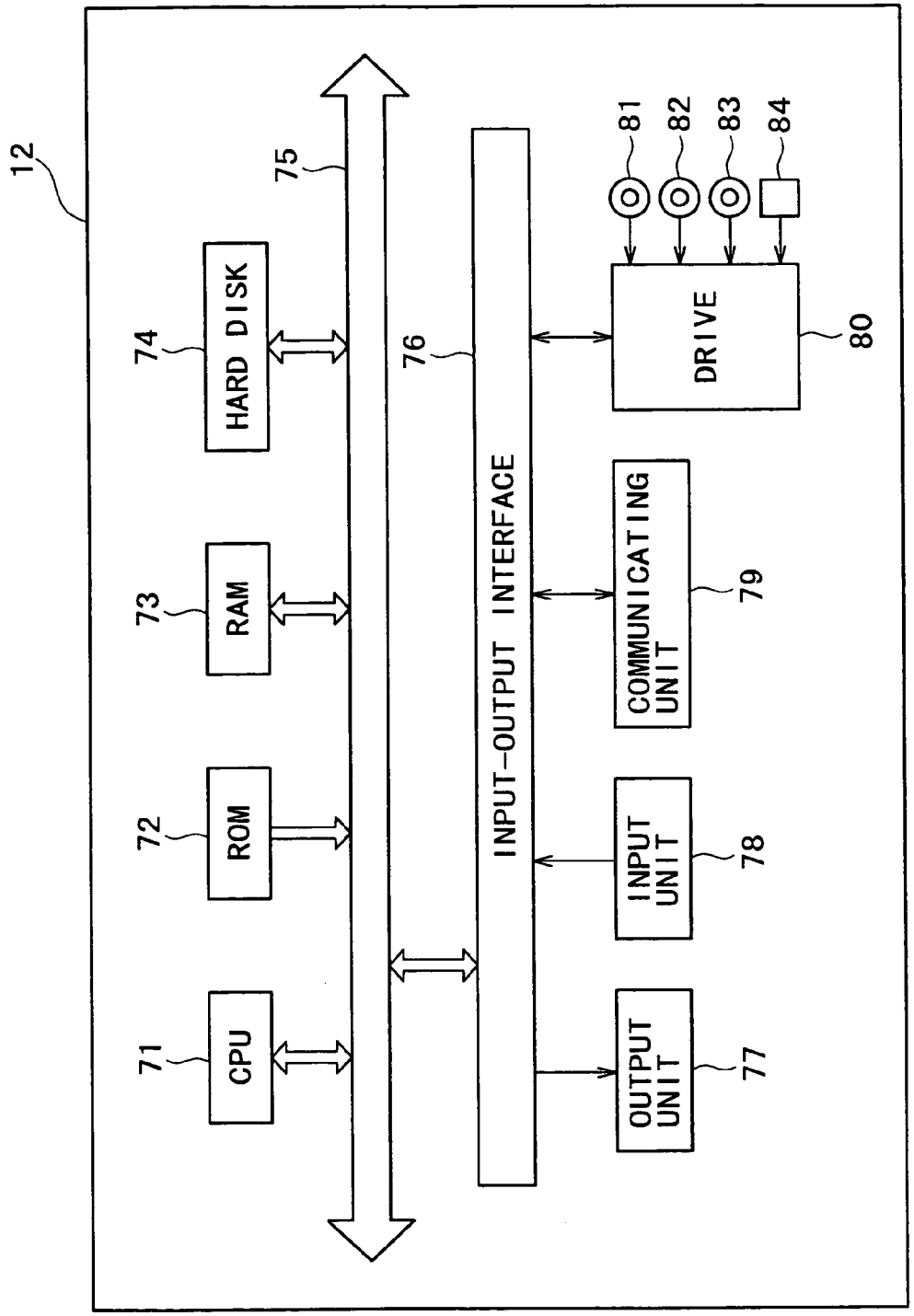
FIG. 5 is a block diagram showing an example of configuration of a service server for portable terminals in FIG. 2.
Figure 6:
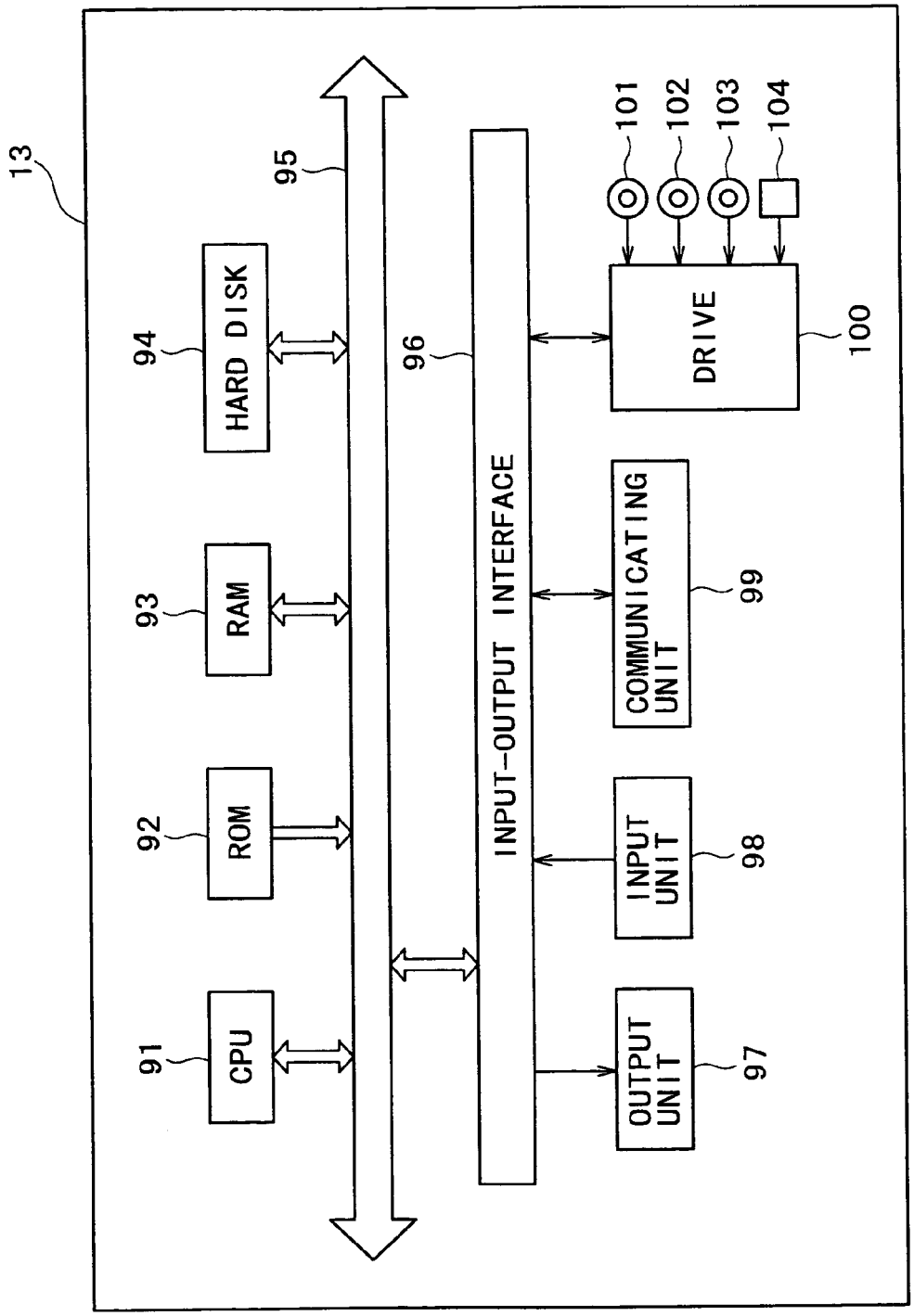
FIG. 6 is a block diagram showing an example of configuration of a service server for stationary terminals in FIG. 2.

FIG. 5 shows an example of configuration of the service server 12 for portable terminals. FIG. 6 shows an example of configuration of the service server 13 for stationary terminals. The service server 12 for portable terminals and the service server 13 for stationary terminals have different processing capabilities but have basically the same configuration as the stationary terminal 11-2 shown in FIG. 4. Therefore description of the service server 12 for portable terminals and the service server 13 for stationary terminals will be omitted.

Figure 7:
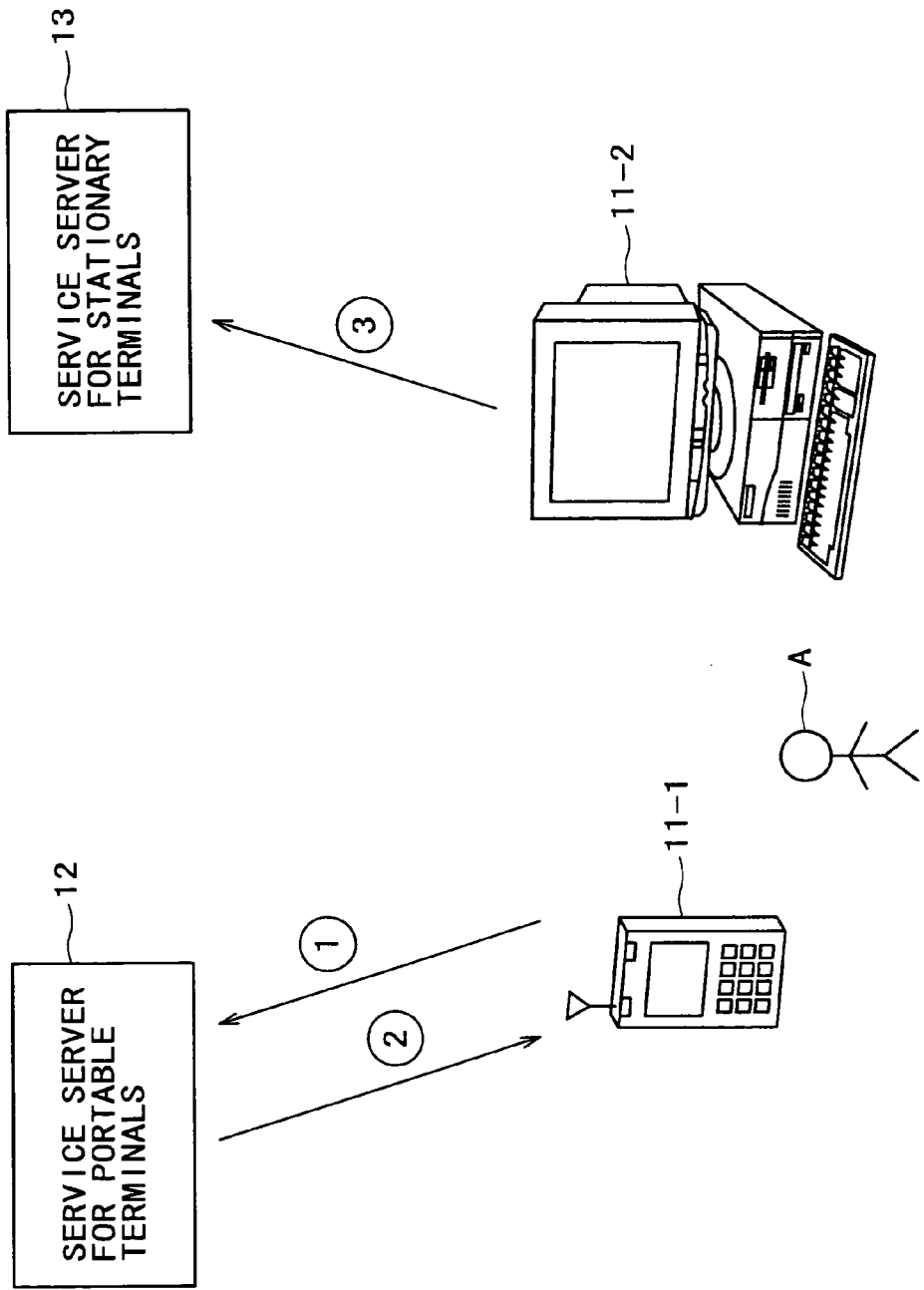
FIG. 7 is a diagram of assistance in explaining user registration processing.

Description will next be made of user registration processing to use the system with reference to FIG. 7.

The user A supplies an address and a telephone number of the user A, an electronic mail address of the portable terminal 11-1, and the like as user information to the service provider for portable terminals (the service server 12 for portable terminals) online (using the portable terminal 11-1) or offline (by postcard, for example) (number 1). When the user information is supplied from the user A, a user ID of the user A is issued, and the user ID and the user information are registered in a hard disk 74 of the service server 12 for portable terminals in association with each other as shown in FIG. 8.

The service provider for portable terminals (the service server 12 for portable terminals) supplies the issued user ID to the user A (portable terminal 11-1) (number 2).

Receiving the user ID issued by the service provider for portable terminals, the user A supplies the user ID and user information (including at least the electronic mail address of the portable terminal 11-1) to the service provider for stationary terminals (the service server 13 for stationary terminals) online (using the stationary terminal 11-2) or offline (number 3). When the user information and the user ID are supplied from the user A, the user ID and the user information are registered in a hard disk 94 of the service server 13 for stationary terminals in association with each other as shown in FIG. 9. Incidentally, fields of "content ID" and "undelivered/delivered" in FIG. 9 will be described later.

User registration processing is performed as described above.

Description will next be made of operation of the apparatuses when the user A purchases a service for portable terminals and a service for stationary terminals with reference to a flowchart of FIG. 10 and FIG. 11 that shows main data transferred in this processing. In this case, suppose that the user A purchases a content for portable terminals (for example a musical piece) from the service server 12 for portable terminals and purchases a content for stationary terminals (for example a movie) from the service server 13 for stationary terminals.

The output unit 36 of the portable terminal 11-1 displays an operating screen used in purchasing a content for portable terminals. When the user A specifies a predetermined content for portable terminals using the operating screen, the CPU 31 of the portable terminal 11-1 in step S1 transmits a content ID of the specified content for portable terminals and the user ID (the user ID issued by the service provider for portable terminals) of the user A to the service server 12 for portable terminals via the communicating unit 38, and thereby requests the purchase of the content for portable terminals.

Figure 11:
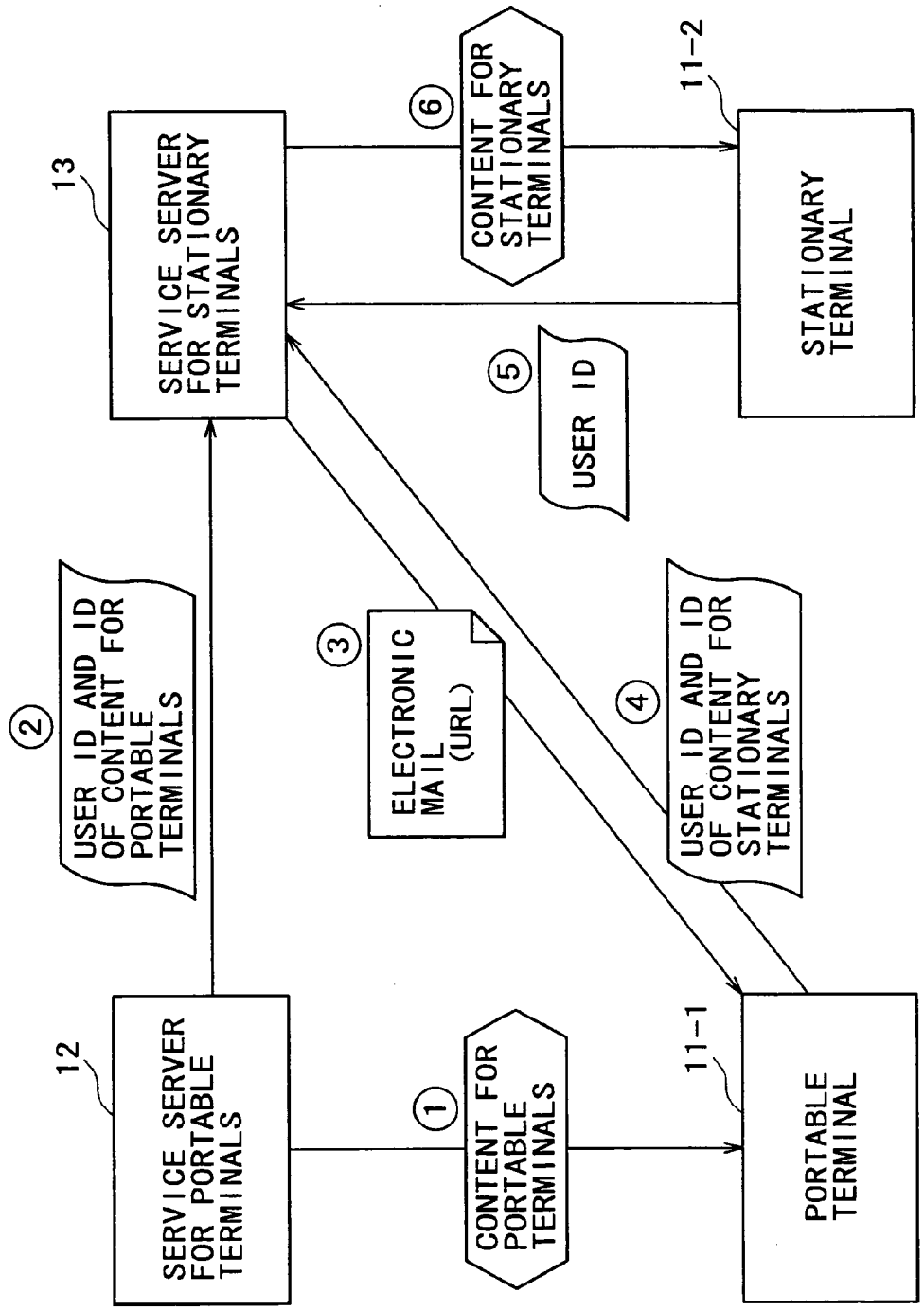
FIG. 11 is a diagram showing data transferred in the processing of purchasing the service for portable terminals and the service for stationary terminals.

When the portable terminal 11-1 requests the purchase of the content for portable terminals, a CPU 71 of the service server 12 for portable terminals in step S11 reads from the hard disk 74 the content for portable terminals identified by the content ID transmitted from the portable terminal 11-1, and transmits the content for portable terminals to the portable terminal 11-1 via a communicating unit 79 (number 1 in FIG. 11). In step S2, the portable terminal 11-1 receives the content for portable terminals. Thereby the user A can use the purchased content for portable terminals.

Further, the CPU 71 of the service server 12 for portable terminals in step S12 transmits the user ID and the content ID transmitted from the portable terminal 11-1 as purchase information to the service server 13 for stationary terminals via the communicating unit 79 (number 2 in FIG. 11).

In step S21, a CPU 91 of the service server 13 for stationary terminals detects from the hard disk 94 a content for stationary terminals related to the content for portable terminals identified by the content ID transmitted as the purchase information from the service server 12 for portable terminals.

In next step S22, the CPU 91 of the service server 13 for stationary terminals transmits an electronic mail including a URL (Uniform Resource Locator) and the like of a page for selling the content for stationary terminals detected in step S21 to the electronic mail address included in the user information of the user A stored in the hard disk 94 in association with the user ID transmitted as the purchase information (FIG. 9) via a communicating unit 99 (number 3 in FIG. 11). In this case, the electronic mail is transmitted to the portable terminal 11-1.

In step S3, the CPU 31 of the portable terminal 11-1 receives the electronic mail from the service server 13 for stationary terminals via the communicating unit 38, and opens the electronic mail (displays the electronic mail on the output unit 36). In next step S4, the CPU 31 of the portable terminal 11-1 determines whether the user A operates the page (URL) for selling the content for stationary terminals and specifies the content for stationary terminals to be purchased. When the CPU 31 of the portable terminal 11-1 determines that the content for stationary terminals to be purchased is specified, the processing proceeds to step S5.

In step S5, the CPU 31 of the portable terminal 11-1 transmits the user ID of the user A and the content ID of the specified content for stationary terminals to the service server 13 for stationary terminals via the communicating unit 38, and thereby requests the purchase of the content for stationary terminals (number 4 in FIG. 11). When the content for stationary terminals to be purchased is not specified in step S4, the processing is ended.

In step S23, the CPU 91 of the service server 13 for stationary terminals determines whether the portable terminal 11-1 has requested the purchase of the content for stationary terminals. When the CPU 91 of the service server 13 for stationary terminals determines that the portable terminal 11-1 has requested the purchase of the content for stationary terminals, the processing proceeds to step S24.

In step S24, the CPU 91 of the service server 13 for stationary terminals registers the content ID of the content for stationary terminals, the content ID being transmitted from the portable terminal 11-1, and delivery processing information indicating "undelivered" in the "content ID" field and the "delivered/undelivered" field, respectively, corresponding to the user ID of the user A in FIG. 9, as shown in FIG. 12. When the CPU 91 of the service server 13 for stationary terminals determines in step S23 that the portable terminal 11-1 has not requested the purchase of the content for stationary terminals, the processing is ended.

The processing for purchasing a service for portable terminals and a service for stationary terminals is thus performed.

Figure 13:
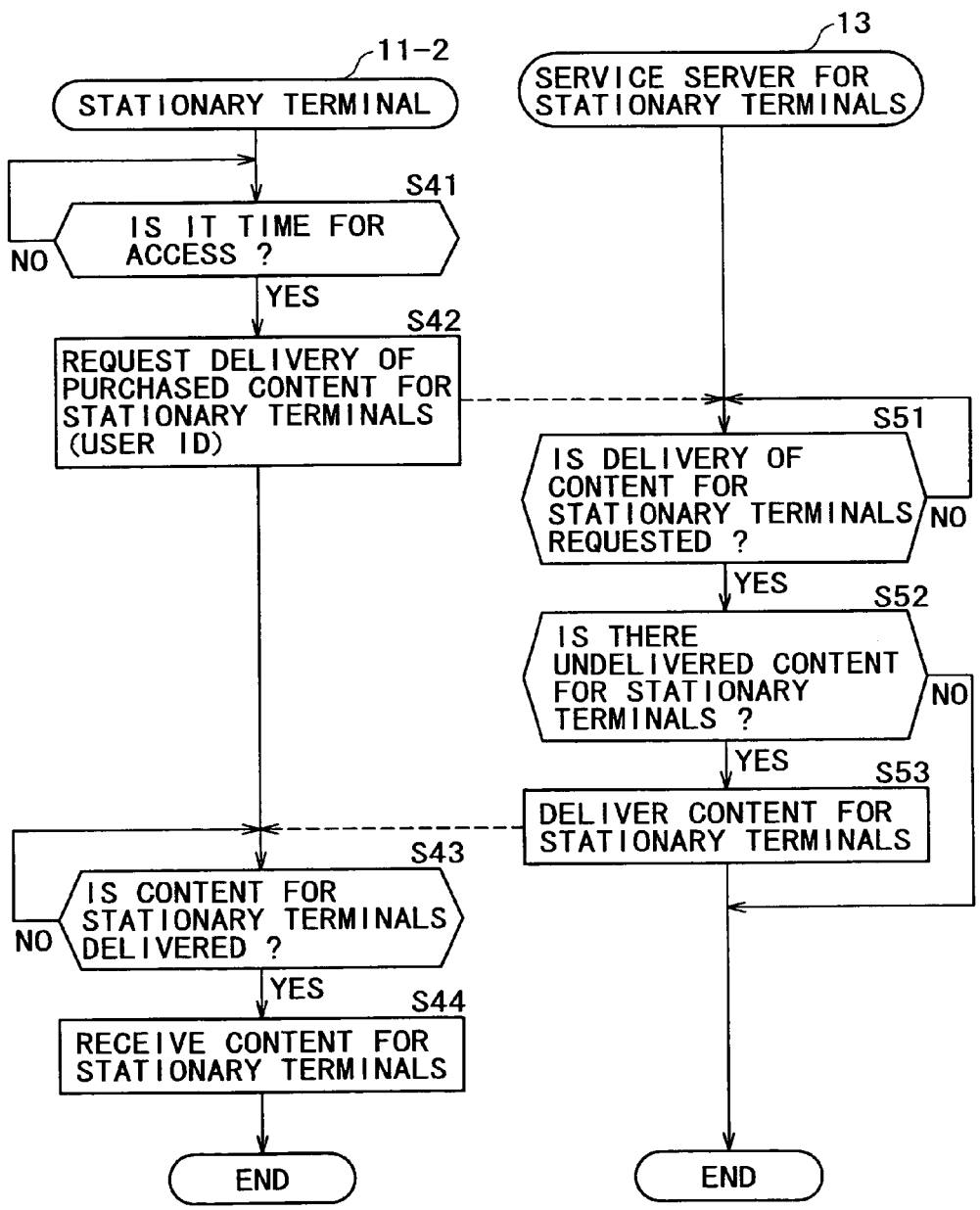
FIG. 13 is a flowchart of assistance in explaining processing for receiving delivery of the purchased service for stationary terminals.

Description will next be made of operation of the service server 13 for stationary terminals and the stationary terminal 11-2 for receiving delivery of the purchased content for stationary terminals with reference to a flowchart of FIG. 13 and FIG. 11.

In step S41, the CPU 51 of the stationary terminal 11-2 determines whether it is a time to access the service server 13 for stationary terminals. When the CPU 51 of the stationary terminal 11-2 determines that it is a time to access the service server 13 for stationary terminals, the processing proceeds to step S42. In this example, suppose that the stationary terminal 11-2 accesses the service server 13 for stationary terminals at predetermined time intervals.

In step S42, the CPU 51 of the stationary terminal 11-2 transmits the user ID of the user A to the service server 13 for stationary terminals via the communicating unit 59, and thereby requests the delivery of the purchased content for stationary terminals (number 5 in FIG. 11).

In step S51, the CPU 91 of the service server 13 for stationary terminals stands by until the stationary terminal 11-2 requests the delivery of the content for stationary terminals, and when the stationary terminal 11-2 requests the delivery of the content for stationary terminals, the processing proceeds to step S52. The CPU 91 of the service server 13 for stationary terminals determines whether there is a content ID stored with delivery processing information indicating "undelivered" in correspondence with the user ID of the user A transmitted from the stationary terminal 11-2 (FIG. 12).

When the CPU 91 of the service server 13 for stationary terminals determines in step S52 that there is a content ID stored with delivery processing information indicating "undelivered," the CPU 91 of the service server 13 for stationary terminals proceeds to step S53. The CPU 91 of the service server 13 for stationary terminals reads the content for stationary terminals identified by the content ID from the hard disk 94, and delivers the content for stationary terminals to the stationary terminal 11-2 via the communicating unit 99 (number 6 in FIG. 11). Further, the service server 13 for stationary terminals changes the delivery processing information corresponding to the content ID of the delivered content for stationary terminals to delivery processing information indicating "delivered," as shown in FIG. 14.

Incidentally, while in this example, the content for stationary terminals is stored on the hard disk 94 and read from the hard disk 94, the content for stationary terminals can be obtained from another server.

In step S43, the CPU 51 of the stationary terminal 11-2 determines whether the content for stationary terminals is delivered from the service server 13 for stationary terminals. When the CPU 51 of the stationary terminal 11-2 determines that the content for stationary terminals is delivered from the service server 13 for stationary terminals, the CPU 51 of the stationary terminal 11-2 proceeds to step S44. The CPU 51 of the stationary terminal 11-2 receives the content for stationary terminals via the communicating unit 59, and then stores the content for stationary terminals on the hard disk 54, for example. Thereby the user A can use the purchased content for stationary terminals. Then, the processing is ended.

As described above, since service providers providing different forms of services provide information about provided services to each other, services can be provided effectively.

In addition, since a URL of a page for selling a service for stationary terminals is transmitted to the portable terminal 11-1, which is convenient to carry, the user A can purchase the service for stationary terminals to be used on the stationary terminal 11-2 without being limited by a location of the user A or the like. Further, while the purchasing procedure is performed via the portable terminal 11-1, the obtainment itself of the purchased service for stationary terminals is performed via the stationary terminal 11-2, so that the service for stationary terminals can be received properly even when the portable terminal 11-1 does not have a function of receiving the service for stationary terminals or the like.

Figure 10:
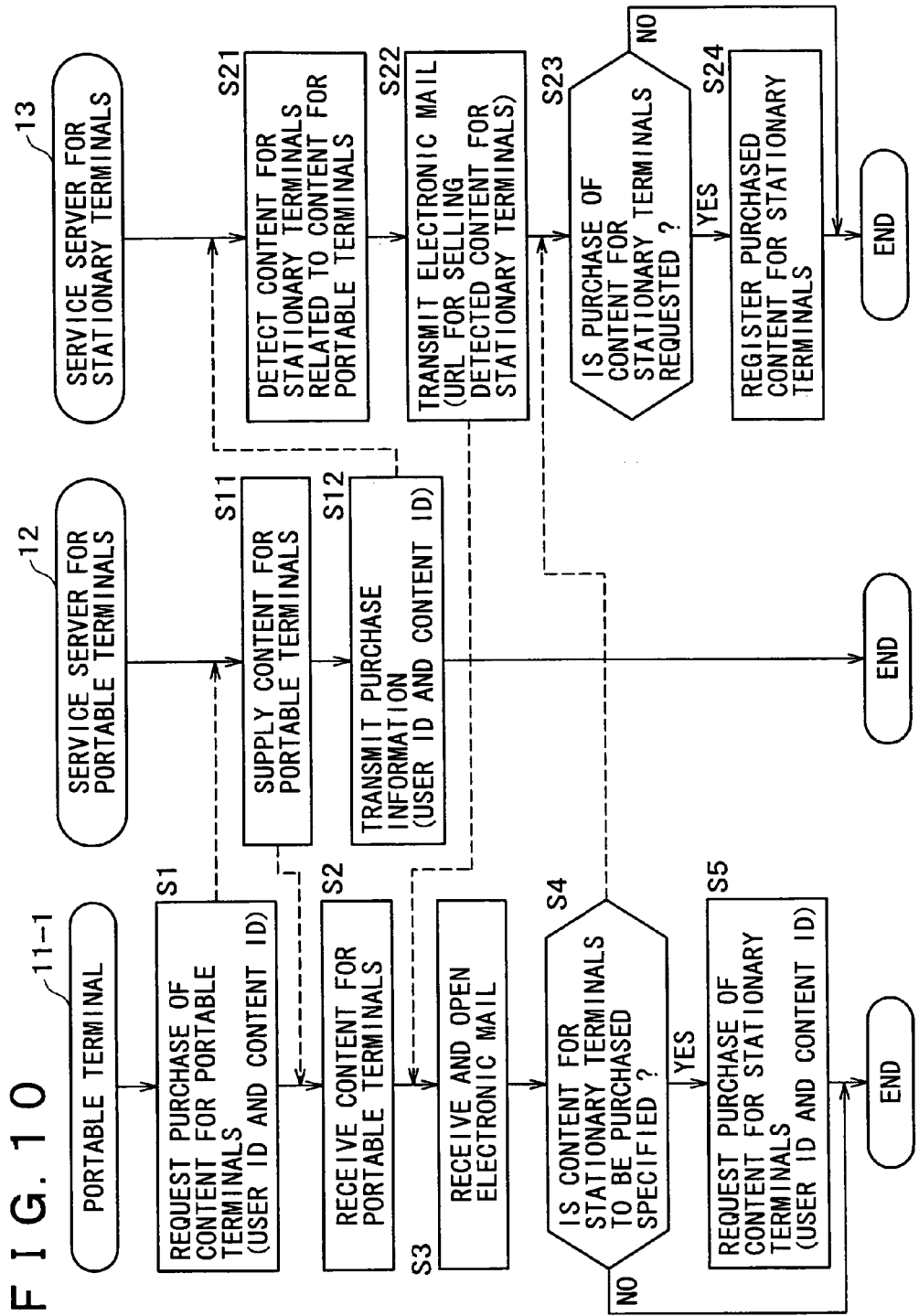
FIG. 10 is a flowchart of assistance in explaining operation in purchasing a service for portable terminals and a service for stationary terminals.

Further, a server ID of the service server 12 for portable terminals can be added to the above-described purchase information (information transmitted from the service server 12 for portable terminals to the service server 13 for stationary terminals in step S12 in FIG. 10) in addition to the user ID of the user A and the content ID of the content for portable terminals, so that the service server 13 for stationary terminals can obtain an aggregate number of receptions (or an aggregate number of transmissions) of purchase information for each service server 12 for portable terminals (supposing that there are a plurality of service servers for portable terminals) and provide services for stationary terminals using the aggregate result.

It is to be noted that in the present specification, the steps describing the program provided on a recording medium include not only processing carried out in time series in the described order but also processing carried out in parallel or individually and not necessarily in time series.

Further, in the present specification, a system refers to an apparatus as a whole formed by a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. A service providing system comprising:
a first server for providing a first service to a first terminal via a network; and
a second server for providing a second service to a second terminal via said network;
wherein said first server includes:
first providing means for providing said first service to said first terminal; and
first transmitting means for transmitting provision information indicating that said first service has been provided by said first providing means to said second server; and
said second server includes:
detecting means for recognizing from said provision information, transmitted from said first transmitting means of said first server, that said first service has been provided to said first server and detecting said second service related to said first service; and
second transmitting means for transmitting recommendation information, for recommending said second service detected by said detecting means, to said first terminal.

2. A service providing system comprising:
a first server for providing a first service to a first terminal via a network; and
a second server for providing a second service to a second terminal via said network;
wherein said first server includes:
first providing means for providing said first service to said first terminal; and
first transmitting means for transmitting provision information indicating that
said first service has been provided by said first providing means to said second server; and
said second server includes:
detecting means for recognizing from said provision information, transmitted from said first transmitting means of said first server, that said first service has been provided to said first server and detecting said second service related to said first service;
second transmitting means for transmitting recommendation information, for recommending said second service detected by said detecting means, to said first terminal;
registering means for registering said second service that is recommended by said recommendation information and requested to be provided to the second terminal by said first terminal; and
second providing means for providing said second service registered by said registering means to said second terminal in response to a request from said second terminal,
wherein the first terminal is a mobile terminal and the second terminal is a stationary terminal.

3. An information processing apparatus as claimed in claim 2, further comprising:
aggregating means for obtaining an aggregate number of transfers of said provision information,
wherein said providing means provides said first service to said first terminal according to an aggregate result by said aggregating means.

4. An information processing apparatus for providing a first service to a first terminal via a network, said apparatus comprising:
detecting means for recognizing that a second service has been provided to a second terminal from provision information indicating that said second service has been provided to said second terminal, said provision information being transmitted from a server for providing said second service to said information processing apparatus via said network, and detecting said first service related to said second service; and
transmitting means for transmitting recommendation information for recommending said first service detected by said detecting means to said second terminal.

5. An information processing apparatus as claimed in claim 4, further comprising aggregating means for obtaining an aggregate number of transfers of said provision information,
wherein said providing means provides said first service to said first terminal according to an aggregate result by said aggregating means.

6. The information processing apparatus according to claim 4, further comprising:
registering means for registering said first service recommended by said recommendation information and requested to be provided to said first terminal by said second terminal; and
providing means for providing said first service registered by said registering means to said first terminal in response to a request from said first terminal,
wherein the first terminal is a stationary terminal and the second terminal is a mobile terminal.

7. An information processing method for providing a first service to a first terminal via a network, said method comprising:
recognizing that a second service has been provided to a second terminal from provision information indicating that said second service has been provided to a second terminal, said provision information being transmitted from a server for providing said second service to a server for providing said first service via said network, and detecting said first service related to said second service; and
transmitting recommendation information for recommending said first service detected by processing of said recognizing to said second terminal.

8. The information processing method according to claim 7, comprising:
registering said first service recommended by said recommendation information and requested to be provided to said first terminal by said second terminal; and providing said first service registered by processing of said registering to said first terminal in response to a request from said first terminal, wherein the first terminal is a stationary terminal and the second terminal is a mobile terminal.

9. A computer readable medium having code embodied therein which causes a computer to implement a method of providing a first service to a first terminal via a network, the method comprising:

recognizing that a second service has been provided to a second terminal from provision information indicating that said second service has been provided to a second terminal, said provision information being transmitted from a server for providing said second service to a server for providing said first service via said network, and controlling detecting said first service related to said second service; and a transmitting control step for controlling transmitting recommendation information for recommending said first service detected by processing of said recognizing to said second terminal.

10. A computer readable medium having code embodied therein which causes a computer to implement a method of providing a first service to a first terminal via a network, the method comprising:

recognizing that a second service has been provided to a second terminal from provision information indicating that said second service has been provided to a second terminal, said provision information being transmitted from a server for providing said second service to a server for providing said first service via said network, and controlling detecting said first service related to said second service;

controlling transmitting recommendation information for recommending said first service detected by processing of said recognizing to said second terminal;

controlling registering said first service recommended by said recommendation information and requested to be provided to said first terminal by said second terminal; and controlling providing said first service registered by processing of said controlling to said first terminal in response to a request from said first terminal, wherein the first terminal is a stationary terminal and the second terminal is a mobile terminal.

11. An information processing apparatus for providing a first service to a first terminal via a network, said apparatus comprising:

a receiver unit configured to receive provision information that indicates an offer of a second service to a second terminal from a second server;

a detection unit configured to detect said first service related to said second service from the provision information; and a transmitter unit configured to transmit recommendation information for recommending said first service detected by said detection unit to said second terminal.

12. The information processing apparatus according to claim 11, further comprising:

a register unit configured to register said first service recommended by said recommendation information and requested to be provided to said first terminal by said second terminal; and a provider unit configured to provide said first service registered by said register unit to said first terminal in response to a request from said first terminal, wherein the first terminal is a stationary terminal and the second terminal is a mobile terminal.

* * * * *